J. F. RUSSELL.
Straw Carrier.
No. 93,559.
2 Sheets—Sheet 1.
Patented Aug. 10, 1869.
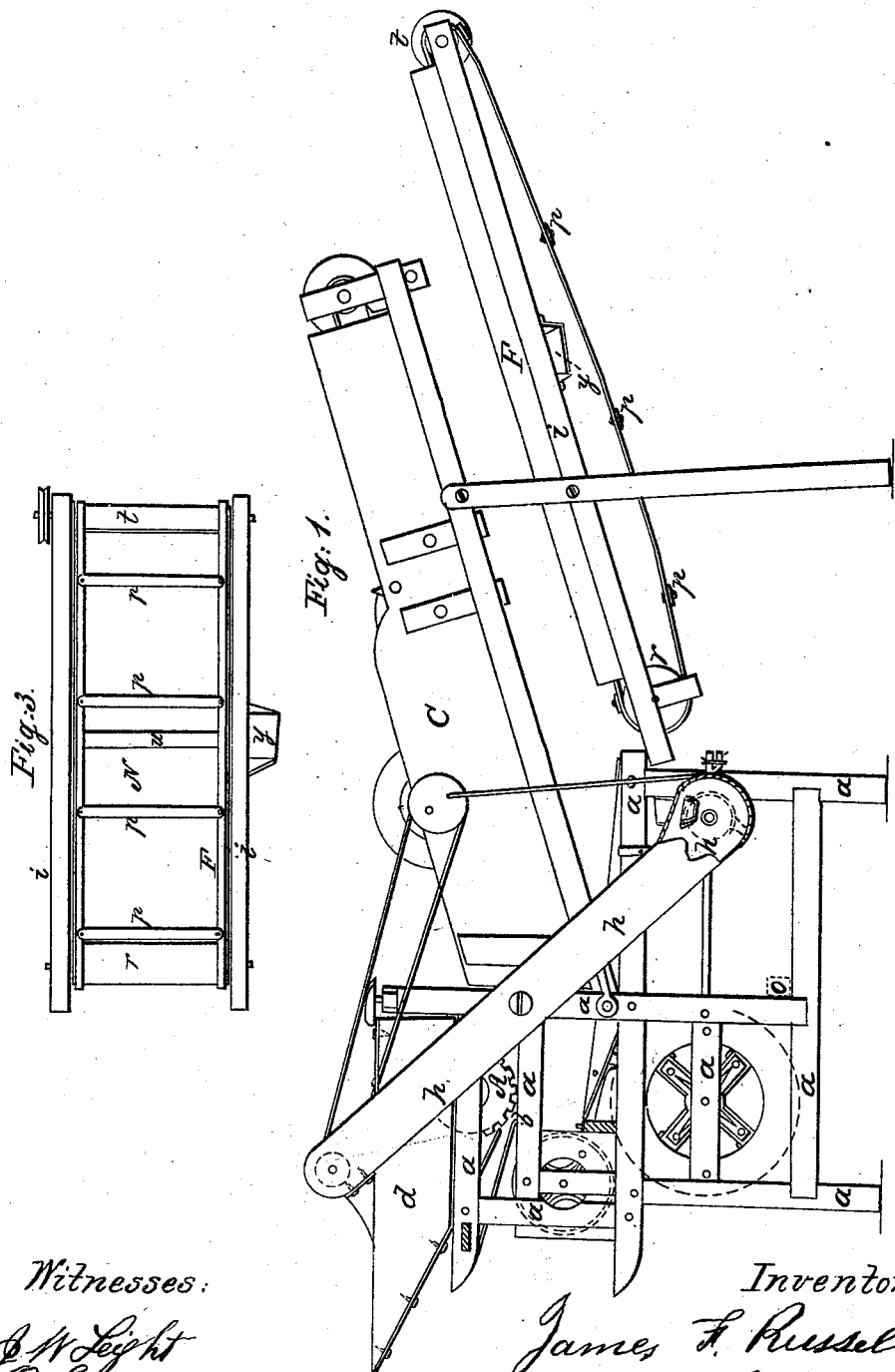

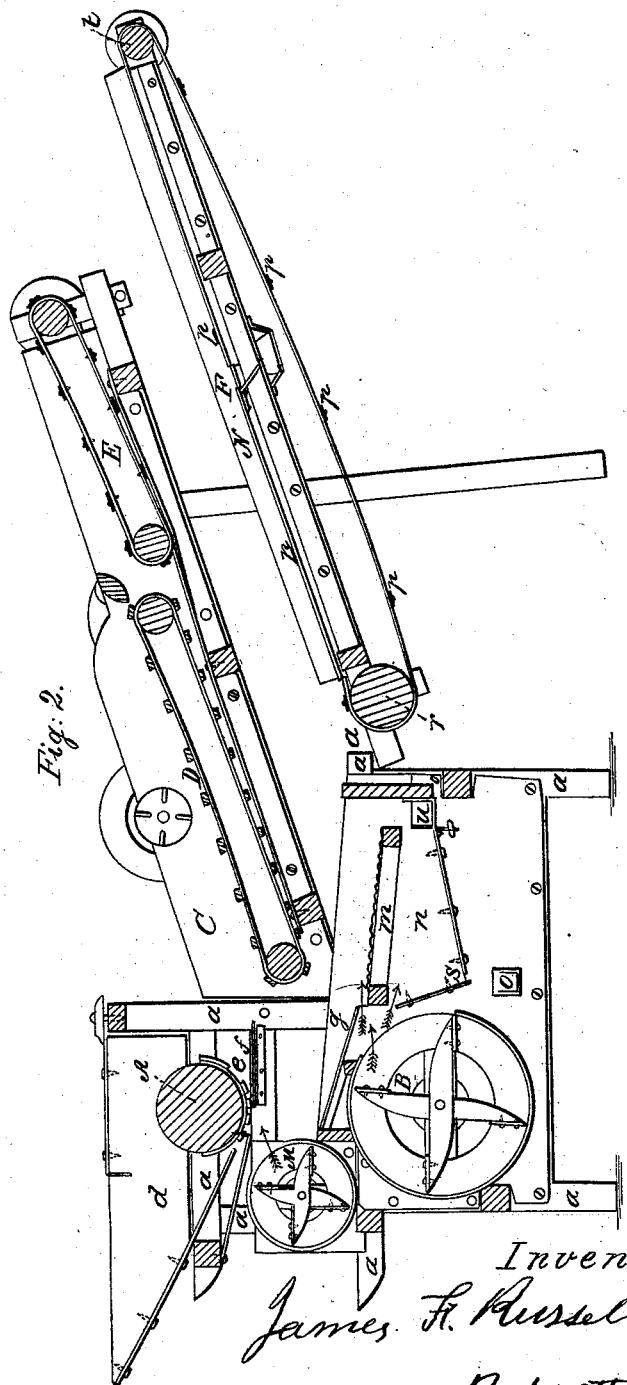

United States Patent Office.

JAMES F. RUSSELL, OF FRANKLIN, OHIO.

Letters Patent No. 93,559, dated August 10, 1869; antedated August 5, 1869.

---

IMPROVEMENT IN GRAIN-SEPARATOR.

---

The Schedule referred to in these Letters Patent and making part of the same.

---

*To whom it may concern:*

Be it known that I, JAMES F. RUSSELL, of Franklin, in Warren county, in the State of Ohio, have invented a new and useful Improvement in Grain-Separators; and I do hereby declare that the following is a full and exact description thereof, reference being had to the accompanying drawings, and to the letters of reference marked thereon.

Figure 1 represents a side elevation of my machine.

Figure 2 represents a longitudinal vertical section of the same.

Figure 3 represents the supplementary carrier and separator of the chaff from the straw.

In constructing my machine, the carriers are made so as to be readily detached from the body of the machine, which is supported by the frame $a$.

The threshing-cylinder $A$, and its concave $b$, are arranged at the bottom of hopper $d$.

The concave is slotted, to freely permit the perfectly-threshed grain to fall through, while a portion, with such heads of grain as are not perfectly threshed, is carried through the wider opening in the concave, at $e$.

As the grain falls from the concave upon the apron $f$, a blast of air is passed through the falling mass, completely separating the chaff and straw from a portion of the wheat or other grain, which falls immediately upon the inclining apron $g$, which conducts to screen $m$, thence out through the openings $s$ and $o$, to a receptacle placed to receive it.

Before the grain reaches the screen $m$, a current of air is passed through the falling mass from the lower fan $B$.

The shoe $n$ is operated like the shoe of a fanning-mill, by means of suitable mechanism, as indicated in fig. 1.

The upper fan $M$, cleans all the grain which is perfectly threshed when it passes to its destination, as above stated.

The imperfectly-threshed grain, such as broken heads of wheat, &c., will be taken, by means of the carrier $C$, and the aprons $D$ $E$, with the straw, until these aprons commence their return-motion, when such broken grain-heads and grain will be discharged upon the inclined bottom of the carrier $C$, and be carried backward and discharged upon screen or riddle $m$, which will permit the grains of wheat, or other grain perfectly threshed, to pass through it, and be discharged through the opening $o$, below shoe $n$.

But those parts of grain-heads which are returned, as above described, upon screen $m$, will, by the action of shoe $n$ and fan $B$, be carried over the shoe and discharged through opening $w$, upon conveyer $h$, which will elevate these imperfectly-threshed parts of the grain, and discharge them into hopper $d$, to be again threshed as before.

The carrier $F$ is provided with two endless belts, which are connected by slats $p$. These slats serve to carry off the straw to any desired distance.

The belts surround a central apron between the frame-pieces $i$ $i'$, and extending from roll $r$ to the roll $t$.

An opening, $u$, is formed across the centre of the apron $N$, beneath which there is a hinged door, with which the opening $u$ may be closed. When it is desired to separate the chaff from the straw, the door should be opened to permit the chaff to pass through slot $u$, and be closed when the chaff is to be conducted away with the straw.

Barley-straw is deemed to be of greater value when separated from the chaff.

There are evidently great advantages in the use of the two fans $M$ $B$, arranged in the manner described, because the machine so provided will accomplish a double amount of work in a given time; and by the aid of carrier-aprons $D$ $E$, and elevator $h$, the grain is completely threshed, instead of being partly discharged with the straw.

It will be observed that a portion of the wheat or other grain is completely separated from the straw and chaff by the aid of fan $M$, as the grain falls through the concave $b$, and thereby the screens or riddles are never overcharged or clogged.

The spout $y$, underneath the slot $u$ of the carrier $F$, serves to conduct the chaff and dust which are separated from the straw, out of the way.

It has been found from practical use, that my improved machine will accomplish in a superior manner more than double the quantity of work of the old machines.

The use of the pulleys, bands, and oscillating-mechanism, (for agitating shoe $n$,) need not be particularly referred to herein, as their uses are familiar to those accustomed to operate grain-threshers and separators.

It should be remarked that my machine can be compactly stored, as both of the carriers are detachable.

Having fully described my improvements in grain-separators—

What I claim, and desire to secure by Letters Patent, is—

The combination and arrangement of fans $M$ $B$, in relation to concave $b$, aprons $f$ $g$, shoe $n$, and carriers $C$ $F$, in the manner and for the purpose substantially as described.

In testimony whereof, I have hereunto set my hand this 16th day of July, 1868.

JAMES F. RUSSELL.

Witnesses:
H. P. K. PECK,
JOHN ARMSTRONG.